(12) United States Patent
Masumoto

(10) Patent No.: US 8,723,031 B2
(45) Date of Patent: May 13, 2014

(54) TERMINAL BOX

(75) Inventor: Yutaka Masumoto, Yao (JP)

(73) Assignee: Hosiden Corporation, Osaka (JP)

( * ) Notice: Subject to any disclaimer, the term of this patent is extended or adjusted under 35 U.S.C. 154(b) by 274 days.

(21) Appl. No.: 13/186,862

(22) Filed: Jul. 20, 2011

(65) Prior Publication Data

US 2012/0048615 A1 Mar. 1, 2012

(30) Foreign Application Priority Data

Aug. 30, 2010 (JP) ................... 2010-192469
Aug. 30, 2010 (JP) ................... 2010-192470
Aug. 30, 2010 (JP) ................... 2010-192471
Aug. 30, 2010 (JP) ................... 2010-192472

(51) Int. Cl.
*H05K 5/00* (2006.01)

(52) U.S. Cl.
USPC ............................ 174/50; 174/60; 439/76.1

(58) Field of Classification Search
USPC .............. 174/50, 520, 541, 549, 60; 439/76.1
See application file for complete search history.

(56) References Cited

U.S. PATENT DOCUMENTS

| | | | |
|---|---|---|---|
| 6,173,643 B1 | 1/2001 | Qian et al. | |
| 6,207,896 B1 * | 3/2001 | Toyomura | 174/58 |
| 6,696,641 B2 * | 2/2004 | Sasaoka | 174/50 |
| 7,928,314 B2 * | 4/2011 | Higashikozono et al. | 136/244 |
| 2008/0190477 A1 * | 8/2008 | Hattori | 136/246 |
| 2009/0260676 A1 | 10/2009 | McMahon et al. | |
| 2010/0039781 A1 | 2/2010 | Tai et al. | |
| 2011/0108085 A1 * | 5/2011 | Quiter | 136/244 |
| 2011/0168228 A1 | 7/2011 | McGreevy et al. | |

FOREIGN PATENT DOCUMENTS

| | | |
|---|---|---|
| EP | 1758176 A1 | 2/2007 |
| JP | 3104755 U | 10/1991 |
| JP | 11-26035 A | 1/1999 |
| JP | 200051077 A | 2/2000 |
| JP | 3069523 U | 3/2000 |
| JP | 2000299485 A | 10/2000 |
| JP | 200177391 A | 3/2001 |
| JP | 2003-197944 A | 7/2003 |
| JP | 2006-339659 A | 12/2006 |
| JP | 2008263673 A | 10/2008 |
| WO | 2009129405 A2 | 10/2009 |

* cited by examiner

*Primary Examiner* — Hung Ngo
(74) *Attorney, Agent, or Firm* — The Webb Law Firm

(57) ABSTRACT

A terminal box includes: a main body (101); at least one pair of terminal strips (106) which are connectable to a positive electrode and a negative electrode of a solar cell module; and a backflow prevention diode (118) bridged between the terminal strips (106) to connect the terminal strips (106). The terminal strip (106) and the backflow prevention diode (118) are contained in the main body (101). The terminal strip (106) includes: a supporting part (S) for supporting a lead wire (118*a*) of the backflow prevention diode (118) in a mounted state; a pinching part (K) for supporting the lead wire (118*a*) in a pinched state; and a recess (119B) which is provided between the supporting part (S) and the pinching part (K) and configured to position a connecting solder upon connecting the lead wire (118*a*) and the terminal strip (106).

7 Claims, 12 Drawing Sheets

TERMINAL BOX

BACKGROUND

1. Field of the Invention

The present invention relates to a terminal box used for a solar cell module.

2. Description of the Related Art

A conventional terminal box includes a main body containing: at least one pair of terminal strips which are connectable to a positive electrode and a negative electrode of a solar cell module; and a backflow prevention diode bridged between the terminal strips to connect the terminal strips. In this type of the terminal box, a pair of the planar terminal strips are arranged in parallel at a distance, the backflow prevention diode is bridged between the terminal strips in such a manner that a lead wire of the backflow prevention diode is placed across a full width of the corresponding terminal strip, and the lead wire is soldered (see, for example, Japanese Utility Model Registration No. 3069523).

In the conventional terminal box described above, the lead wire of the backflow prevention diode is soldered while the lead wire is placed on the planar terminal strip, and thus the solder is likely to spread to other parts along a plane of the terminal strip, and heat of the spread solder may involve a risk of an adverse influence on other parts (e.g. devices). In addition, if the solder spreads to other parts and an amount of the solder becomes insufficient for an essential portion of the lead wire, there is a risk of lowering in a fixing strength. In other words, there is a problem that fixing of the backflow prevention diode is likely to become unstable.

Another conventional terminal box includes: at least one pair of terminal parts which are provided in a main body and connectable to a positive electrode and a negative electrode of a solar cell module; at least one pair of connection parts which are provided on one lateral face of the main body and each of which is configured to conductively connect an external cable to the terminal part; and an adhesive surface which is provided on a rear face of the main body and adhesive to the solar cell module. In this type of the terminal box, the main body has a cuboid shape, one of whose four lateral faces is provided with a connection part, with each of the other three lateral faces being in a shape of a planar wall (see, for example, Japanese Unexamined Patent Application Publication No. 2006-339659). In addition, a rear face as bottom of the main body is configured so that an entire surface constitutes an adhesive surface to which an adhesive is applied.

In the conventional terminal box described above, if an external force acts on an external cable connected to the connection part in a direction to remove the terminal box from an attaching face of the solar cell module (hereinbelow, referred to as "removing direction"), there may be cases where the adhesive surface is peeled off and the terminal box is detached. A relationship between an external force P and an adhesive force (resultant force) J in this case is represented in the drawing of FIG. 9A. Specifically, on a connection part 208 provided on one lateral face B3 of a main body 201, the external force P in the removing direction acts, and on an adhesive surface 207, the adhesive force J acts as a drag. Since the external force P and the adhesive force J are different in their point of actions, these forces act as a couple of forces. As a result, a rotational moment in which the other lateral face B4 of the main body 201 serves as a rotational center acts on the main body 201.

The reference character "Lp" in the drawing indicates a distance from the rotational center to a point on which the external force P acts. The reference character "Lj" in the drawing indicates a distance from the rotational center to a point on which the adhesive force J acts. The following relationship is obtained: Lp=(Lj×2).

Therefore, in order to prevent the terminal box from being removed which may otherwise be caused by the action of the external force P, a balancing relational expression of (Lj×J)>(Lp×P) should be met. In other words, an adhesive material should be upgraded to one with a higher adhesion strength.

For a terminal box in which a bottom wall of a main body is provided with a terminal strip to which an output terminal of a solar cell module and a core of a power cable are connected, Japanese Unexamined Patent Application Publication No. 11-26035 describes that the terminal strip is disposed inside the main body, the power cable (output cable in the document) is inserted into the main body and the core of the power cable is swaged by a swaging part of the terminal strip, to thereby electrically connect the power cable and the terminal strip. The document also describes that a lead wire of a bypass diode is soldered to a projection piece of each of a pair of the terminal strips, and the output terminal (lead wire in the document) of the solar cell module is soldered to a leg part of the terminal strip.

Japanese Unexamined Patent Application Publication No. 11-26035 further describes that an engaging hole is formed in the terminal strip, an engaging projection of the main body is inserted into the engaging hole so that the engaging projection protrudes from the engaging hole, and the protruding portion is melted using ultrasonic wave to make a diameter larger and then cured, to thereby fix the terminal strip to the bottom wall of the main body.

As described above, the terminal box used for the solar cell module requires works to connect the output terminal of the solar cell module and the power cable to the terminal strip, when the solar cell module is installed. As a result, more efforts are required, and thus improvement in workability has been demanded.

Considering a mode of work upon inserting the power cable into the main body, a coating of the power cable is removed to expose the core which is then inserted into a hole or the like of the main body. Since thin wire rods are used for the core, they are likely to be bent. Consequently, when the core is inserted into a hole or the like, the core frequently comes into contact with a wall face inside the main body, a rib or the like, and a smooth insertion is hindered. Especially, when the core comes into contact with an interior of the main body, there may be cases where a bundle of the wire rods spread (unravel), and thus there is a room for improvement.

For a terminal box including: a main body containing a terminal strip configured to electrically connect an output terminal of a solar cell module and a power cable; and a lid for closing an opening of the main body, Japanese Unexamined Patent Application Publication No. 2003-197944 describes a configuration in which a terminal strip (electrode connection terminal in the document) is provided on a bottom wall of a main body (terminal box in the document), a lid is provided for closing an opening of the main body, a sealing groove is formed along a peripheral wall surrounding the opening of the main body, and a sealing member is provided in the sealing groove.

Japanese Unexamined Patent Application Publication No. 2003-197944 describes a configuration in which a mounting part for lid as an engagement recess is formed in the peripheral wall surrounding the opening of the main body, while the lid is provided with an engagement projection. Due to this configuration, when the opening of the main body is closed with the lid, the engagement projection of the lid engages with the engagement recess of the mounting part and a closed state is retained. At the same time, the sealing member is brought into contact with an inner face of the lid to create a sealed state. When this lid is removed, maintenance and inspection, or repair of failures, can be performed.

Japanese Unexamined Patent Application Publication No. 2003-197944 also describes a configuration in which, while the power cable (connection cable in the document) is inserted into the main body, the lid is attached to the main body, and the core of the power cable is brought into contact with the terminal strip by a pressure of a pressing part of the lid.

As described in Japanese Unexamined Patent Application Publication No. 2003-197944, the terminal box is often used in a state in which it is brought into close contact with a rear face or the like of the solar cell module, and for the purpose of preventing rain water and dust from entering the terminal box, a high sealability is demanded in the closed lid. In addition, for maintenance and inspection or repair of failures, the lid should be removed.

However, as described in Japanese Unexamined Patent Application Publication No. 2003-197944, in the case of the terminal box in which the lid is completely fitted with the main body to keep the closed state, when an internal pressure of the main body is increased, for example, along with the temperature increase, it becomes difficult to discharge air inside. Accordingly, the terminal box or the lid may be deformed.

An object of the present invention is to provide a terminal box that solves the above-mentioned problems and ensures the fixing of the backflow prevention diode to the terminal strip.

Another object of the present invention is to provide a terminal box that solves the above-mentioned problems and is unlikely to be removed without using an upgraded adhesive material.

Still another object of the present invention is to provide a reasonably configured terminal box in which work of connecting the power cable to the terminal strip is facilitated.

A further object of the present invention is to reasonably configure a terminal box in which the internal pressure of the main body can be released while the sealability of the main body is retained.

SUMMARY OF THE INVENTION

An aspect of the present invention lies in that a terminal box includes: a main body; at least one pair of terminal strips which are connectable to a positive electrode and a negative electrode of a solar cell module; and a backflow prevention diode bridged between the terminal strips to connect the terminal strips; wherein the terminal strips and the backflow prevention diode are contained in the main body, and the terminal strip includes: a supporting part for supporting a lead wire of the backflow prevention diode in a mounted state; a pinching part for supporting the lead wire in a pinched state; and a recess which is provided between the supporting part and the pinching part and configured to position a connecting solder upon connecting the lead wire and the terminal strip.

According to this aspect of the present invention, since a recess is provided on the terminal strip, the solder can be easily positioned around the recess on the terminal strip. Therefore, unlike the conventional technique, the solder is unlikely to spread to other parts, and heat of the solder is prevented from giving an adverse influence on other parts (e.g. devices) or lowering in the fixing strength of the backflow prevention diode. Therefore, the soldering can be securely performed even though an amount of the solder is small. In addition, the lead wire of the backflow prevention diode is supported in a mounted state by the supporting part of the terminal strip, pinched by the pinching part, and fixed by the solder whose position is determined by the recess as described above. Therefore, the lead wire can be securely fixed, as compared with the conventional terminal box.

Another aspect of the present invention lies in that the terminal strip is formed of a metal plate, the supporting part is formed of a protruding part which protrudes from a part of a face of the terminal strip, and the pinching part is formed of a pair of cut and raised parts each formed by cutting and raising an edge part of the terminal strip.

According to this aspect of the present invention, while achieving the effects as described above, the specific configuration described above does not require special parts and can be achieved by a simple processing on the single terminal strip. As a result, production costs can be reduced.

Still another aspect of the present invention lies in that a terminal box includes: a main body; at least one pair of terminal parts which are provided in the main body and connectable to a positive electrode and a negative electrode of a solar cell module; at least one pair of connection parts which are provided on a first lateral face of the main body and configured to conductively connect an external cable to the terminal part; and an adhesive surface which is provided on a rear face of the main body and adhesive to the solar cell module, wherein a reinforcing rib is provided on a second lateral face on an opposite side of the main body to the connection part, the reinforcing rib jutting out and having a contacting part that comes into contact with a surface of the solar cell module when installed.

According to this aspect of the present invention, the second lateral face which is on the opposite side to the connection part is provided with the reinforcing rib jutting out and having the contacting part which comes into contact with the surface of the solar cell module when installed. The reinforcing rib can serve as a strength member together with the main body, and at the same time, as shown in FIG. 9B, a position of the rotational center can be moved to a side where a reinforcing rib 209 protrudes, when the external force in the removing direction acts on the connection part 208. As a result, with the proviso that a displaced amount of the rotational center is α, the balancing relational expression in the present invention becomes $\{(Lj+\alpha) \times J\} > \{(Lp+\alpha) \times P\}$. This means that a rate of increase is larger in a rotational moment by the adhesive force (left side of the balancing relational expression), than in a rotational moment by the external force P (right side of the balancing relational expression). To put it another way, this means that, when an adhesive material with the same adhesion strength is used, the terminal box of the present invention becomes more unlikely to be removed.

For convenience of easy understanding of the relationship, the description will be made by substituting constants for respective variables in the balancing relational expression. With the proviso that $Lp=2$, $Lj=1$, and $\alpha=1$, the required adhesive force J will be obtained below for each of the conventional balancing relational expression and the balancing relational expression according to the present invention.

In the conventional case, since $(Lj \times J) > (Lp \times P)$ becomes $(1 \times J) > (2 \times P)$, the following relationship is obtained: $J > 2 \times P$.

In the case of the present invention, since $\{(Lj+\alpha) \times J\} > \{(Lp+\alpha) \times P\}$ becomes $\{(1+1) \times J\} > \{(2+1) \times P\}$, the following relationship is obtained: $(2 \times J) > (3 \times P)$, i.e. $J > 1.5 \times P$.

Simply put, under the calculation conditions described above, in the conventional case, the required adhesive force J is twice or more as large as the external force P, while in the present invention, the required adhesive force J is 1.5 times or more as large as the external force P. This means that when an adhesive material with the same adhesion strength is used, the terminal box of the present invention is less likely to be removed as compared with the conventional terminal box.

A further aspect of the present invention lies in that the contacting part of the reinforcing rib is formed at a distance from the adhesive surface of the main body.

According to this aspect of the present invention, when the adhesive material is provided on the adhesive surface of the main body, the adhesive can be provided exclusively on the adhesive surface. Accordingly, efficiency of the installation work of the adhesive material can be improved. In other words, when, for example, the adhesive material applicable to the object is used, it is not necessary to pay meticulous attention in such a manner that the adhesive material is applied only to the adhesive surface but not to the reinforcing rib. As a result, the application work of the adhesive material can be performed simply and efficiently.

A still further aspect of the present invention lies in that a double-stick tape adhesive to the surface of the solar cell module is attached to the contacting part of the reinforcing rib.

According to this aspect of the present invention, until the adhesive material provided between the solar cell module and the main body exerts satisfactory adhesion strength, a positional shift of the main body on the solar cell module can be prevented by the double-stick tape. As a result, properties of the adhesive material are fully exerted and the terminal box can be further securely fixed to the solar cell module.

Another aspect of the present invention lies in that a terminal box includes: a main body; and a terminal strip provided on a bottom wall of the main body, to which an output terminal of a solar cell module and a core of a power cable are connected, wherein the main body has a terminal block protruding from the bottom wall, the terminal strip is provided on the terminal block, the main body is provided with an insertion hole into which the power cable is inserted toward the terminal strip, and the terminal block is provided with an inclined face which is brought into contact with an end part of the power cable and guides the end part in a direction away from the bottom wall when the power cable is inserted into the insertion hole.

According to this aspect of the present invention, when the power cable is inserted into the main body, the end part of the power cable comes into contact with the inclined face and the end part of the power cable can be guided in a direction in which the end part is raised from the bottom wall. With this configuration, even when a coating of the end part of the power cable is removed to expose the core, the work of leading the power cable into the main body and electrically connecting the core to the terminal strip is facilitated, while inconvenience of spreading the core bundle can be suppressed. As a result, the terminal box can be reasonably configured in which the work for connecting the power cable to the terminal strip is facilitated.

In the present invention, the insertion hole may be formed at a higher level than a level of the bottom wall as measured from the bottom wall, the terminal block may be provided with a support face configured to be brought into contact with the terminal strip, and the inclined face may span a region between a vicinity of the bottom wall and the support face.

According to this configuration, by simply inserting the power cable into the insertion hole, even when the distal end part of the power cable is oriented toward the bottom wall, the distal end part of the power cable can be brought into contact with the inclined face and the end part of the power cable can be reasonably guided.

In the present invention, the terminal box may further include a lid, the main body may have an opening at a position opposite to the bottom wall, the lid may be configured to close the opening, and the terminal strip may be removably held in engagement with the terminal block.

According to this configuration, when the lid is opened and the distal end part of the power cable is inserted into the insertion hole, the power cable guided toward the opening by the inclined face can be easily led into the main body. Next, the core on the end part of the power cable is electrically connected to the terminal strip which is removed from the terminal block. Upon this connection, since the terminal strip is separate from the terminal block, work can be easily performed. After this connection, work can be easily performed in which the terminal strip is held in engagement with the terminal block and the opening is closed with the lid.

Still another aspect of the present invention lies in that a terminal box includes: a main body having an opening; a terminal strip which is provided in the main body and configured to electrically connect an output terminal of a solar cell module and a power cable; and a lid configured to close the opening of the main body, the terminal box further including: a groove-shaped air vent which is formed in an inner wall face at the opening of the main body and extends from inside the main body to an opening edge of the opening; a projecting wall part which is formed on an inner face side of the lid and configured to be fitted in the opening; an annular sealing member supported on an outer periphery of the projecting wall part; and a retention mechanism configured to retain the lid at a closed position, wherein when the lid is retained at the closed position by the retention mechanism, the sealing member is brought into contact with a part of the inner wall face of the opening which part is located on a bottom wall side of the main body relative to the air vent, and when the lid is displaced in a direction away from the opening against a retaining force of the retention mechanism due to an increase of an internal pressure, the sealing member reaches a position where the sealing member overlaps the air vent through which air is allowed to be discharged.

According to this aspect of the present invention, when the lid is retained at the closed position by the retention mechanism, the sealing member supported on the lid is brought into contact with all circumference of the inner wall face of the opening of the main body. Accordingly, an excellent sealing condition can be attained. In addition, when the lid is retained at the closed position and the internal pressure of the main body is increased, a part or whole of the lid is displaced outward against a retaining force of the retention mechanism. In this case, when the sealing member reaches a position of the air vent, air inside the main body is discharged outside from the air vent. Therefore, the reasonably configured terminal box is obtained in which the internal pressure of the main body can be released while the sealability of the main body is retained.

In the present invention, the opening is in a rectangular shape, the lid is in a rectangular shape having a pair of longitudinal sides and a pair of transversal sides, the retention mechanisms are provided for connecting either a pair of the longitudinal sides or a pair of the transversal sides to the main body, and the air vent is formed in the inner wall face of the opening facing the side of the lid which is not retained by the retention mechanism, from among the longitudinal sides and the transversal sides.

According to this configuration, the opposing sides of the rectangular lid are retained to the main body by the retention mechanisms, and when the internal pressure of the main body is increased, the sides of the lid which are not retained by the retention mechanisms, from among the transversal sides and the longitudinal sides, are allowed to elastically deform outward. By allowing the elastic deformation in this manner, air inside can be discharged, and after this discharge, the lid in a state of elastic deformation resumes its original shape, and thus a sealing state by the sealing member can be maintained.

DETAILED DESCRIPTION OF THE PREFERRED EMBODIMENT

Embodiment 1

Figure 1:
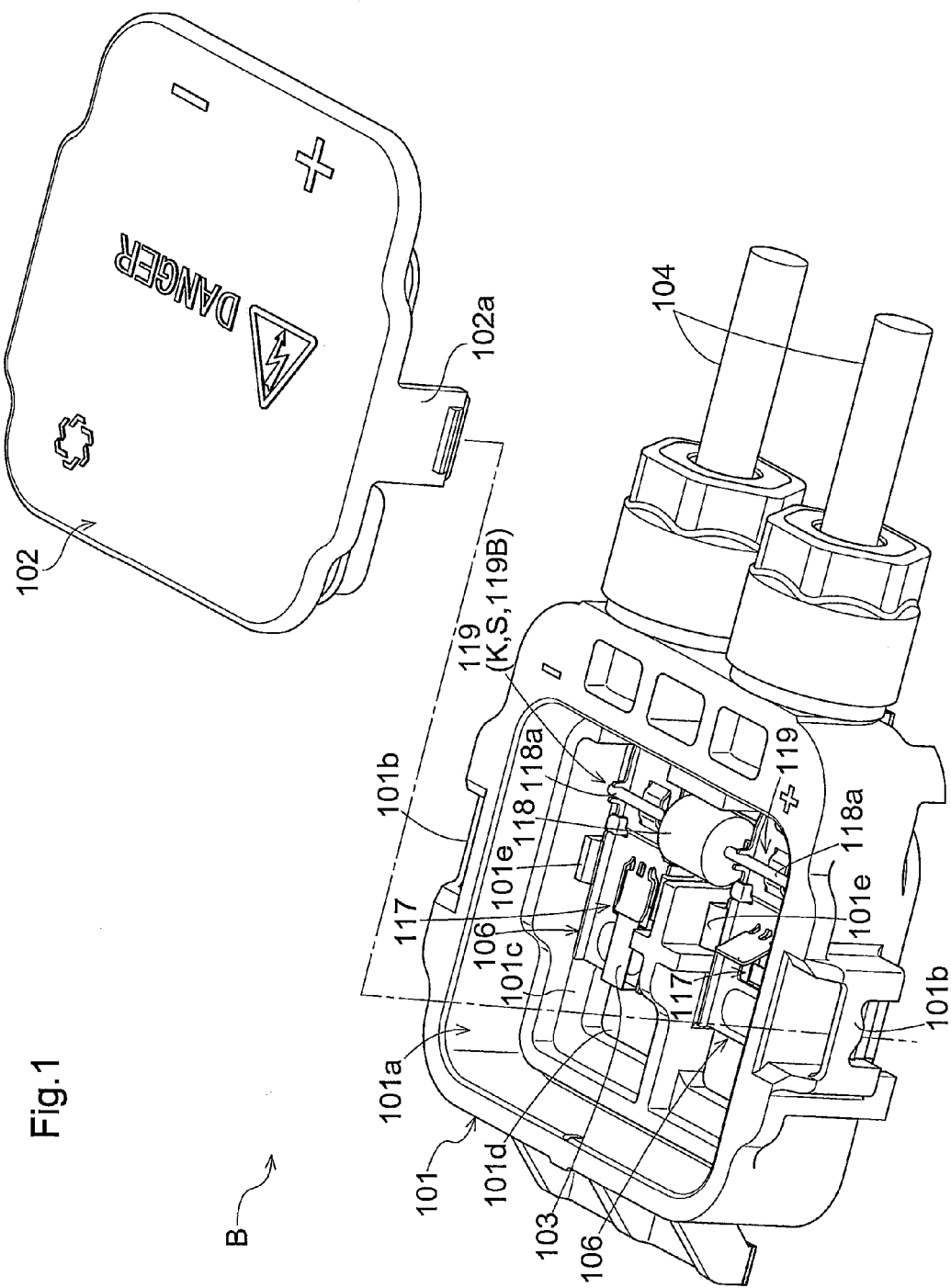
FIG. 1 is an exploded perspective view showing a terminal box in Embodiment 1.

Hereinbelow, embodiments of the present invention will be described with reference to the drawings. FIG. 1 shows a terminal box B for a solar cell module according to the present invention. The terminal box B includes: a main body 101 made of resin; and a lid 102 made of resin for closing an opening 101*a* of the main body 101.

The main body 101 has a pair of locking parts 101*b* integrally formed on respective lateral sides of the main body 101. The lid 102 has a pair of claws 102*a* integrally formed on respective lateral sides of the lid 102. By pushing the claws 102*a* of the lid 102 into the respective locking parts 101*b* of the main body 101 and allowing the claws 102*a* and the respective locking parts 101*b* to lock together, the opening 101*a* of the main body 101 is closed with the lid 102.

Inside the main body 101, a pair of terminal strips 106 are attached. A pair of the terminal strips 106 are configured to electrically connect a pair of respective band plate-shaped output terminals 103 of the solar cell module to a pair of respective output cables 104 connected to a storage battery or the like.

In a bottom plate 101*c* of the main body 101, a pair of introduction holes 101*d* are formed so as to penetrate the bottom plate 101*c*. A pair of the output terminals 103 are separately introduced inside the main body 101 through the respective introduction holes 101*d*.

Figure 2:
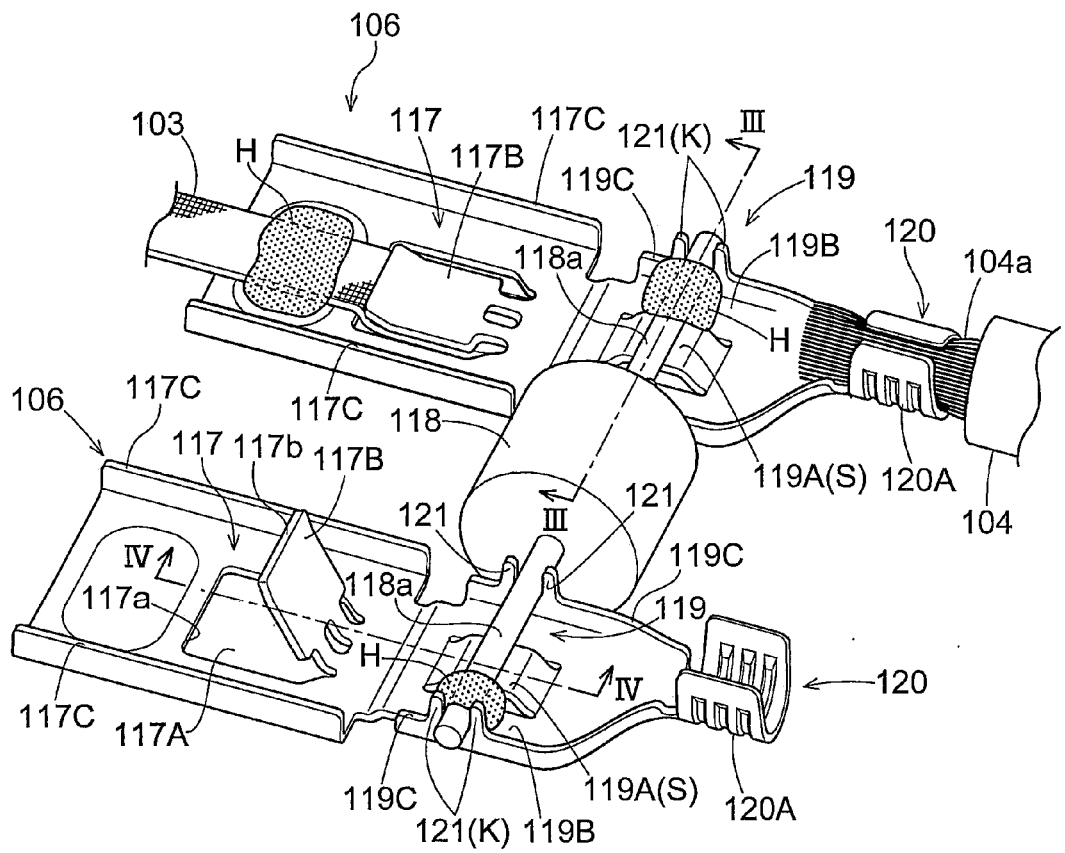
FIG. 2 is an enlarged perspective view showing a connection state between terminal strips and a diode in Embodiment 1.
Figure 3:
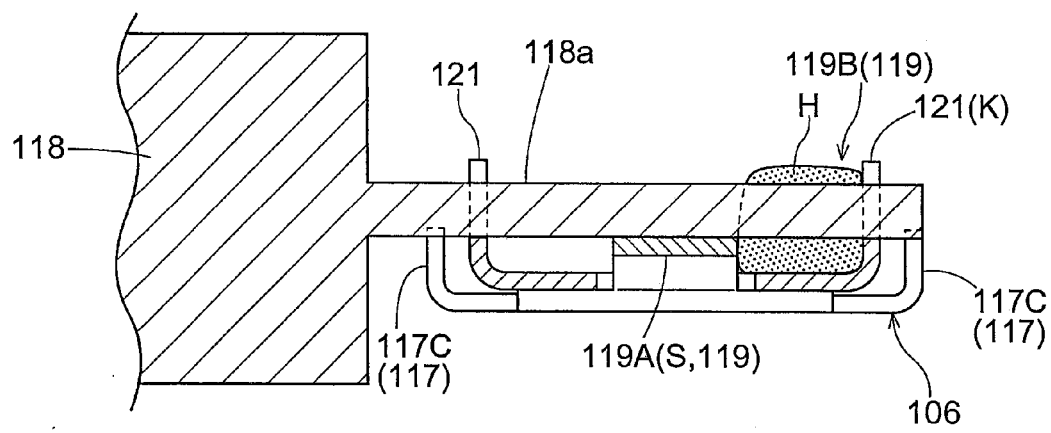
FIG. 3 is a cross-sectional view taken along a line III-III in FIG. 2.
Figure 4:
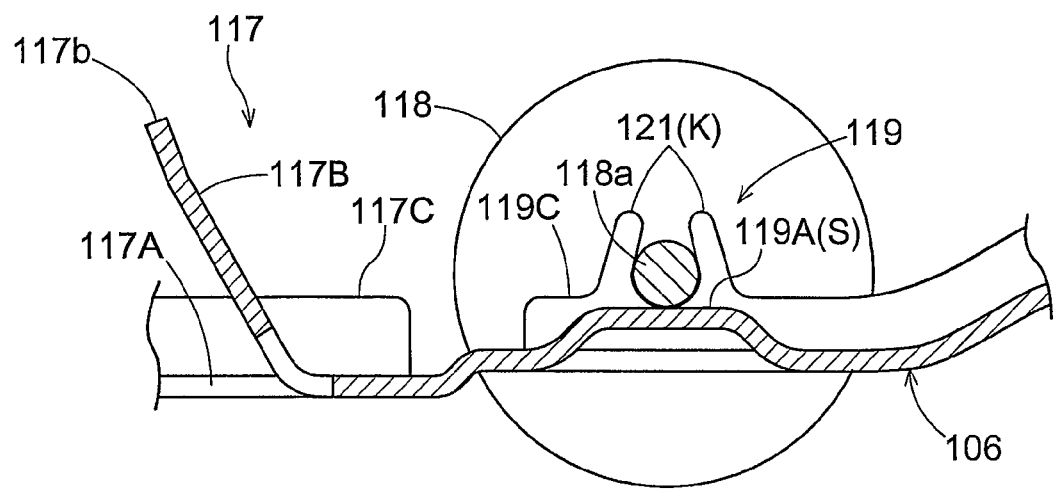
FIG. 4 is a cross-sectional view taken along a line IV-IV in FIG. 2.

Each of the terminal strips 106 is formed of a conductive metal plate. As shown in FIGS. 2-4, the terminal strip 106 includes: a terminal connection part 117 to which the output terminal 103 is electrically connected; a diode connection part 119 to which a backflow prevention diode (hereinafter, simply referred to as "diode") 118 is electrically connected; and a cable connection part 120 to which an output cable 104 is electrically connected, all integrally formed together. The terminal strip 106 is fixed to the main body 101 by locking claws 101*e* vertically arranged on the bottom plate 101*c* (see FIG. 1).

As shown in FIG. 2, the terminal connection part 117 includes: an approximately rectangular-shaped insertion hole 117A into which a distal end part of the output terminal 103 is inserted; and a swingable locking piece 117B which is formed of a piece cut and raised at one peripheral side part of the insertion hole 117A. In addition, each of both lateral edge parts of the terminal connection part 117 is raised upward as a rib 117C, for reinforcing the terminal connection part 117. The rib 117C is to be locked with the locking claw 101*e* of the main body 101.

One example of a method for attaching the output terminal 103 to the terminal connection part 117 includes: inserting the distal end part of the output terminal 103 into the insertion hole 117A; pushing the swingable locking piece 117B back to the insertion hole 117A; and compressing and fixing the output terminal 103 between an inner edge part 117*a* of the insertion hole 117A and an edge part 117*b* on a swingable distal end side of the swingable locking piece 117B. Further, a part of the output terminal 103 overlapping an upper face of the terminal connection part 117 may be soldered.

As shown in FIGS. 2 and 3, each of both lateral edge parts of the diode connection part 119 is formed as a cut and raised part 119C in a shape of a rib which is cut and raised upward. On the other hand, in a central part in a width direction of the diode connection part 119, a protruding part 119A is formed by protruding a part of a face of the terminal strip 106. Consequently, a recess 119B is formed between the cut and raised part 119C and the protruding part 119A.

In addition, a pair of projections 121 are formed integrally with the cut and raised part 119C. A distance between the projections 121 is set in such a manner that a lead wire 118*a* of the diode 118 can be fitted therebetween. As shown in FIG. 4, by fitting the lead wire 118*a* between a pair of the projections 121 and plastically deforming a pair of the projections 121 in a direction that they come close to each other (swaging a pair of the projections 121), the lead wire 118*a* is supported in a pinched state. The pair of the projections 121 constitute a pinching part K.

On the other hand, the lead wire 118*a* of the diode 118 is supported in a mounted state on the protruding part 119A. This protruding part 119A constitutes a supporting part S.

The diode 118 is fixed to the terminal strip 106 through a combination of the pinching and fixing by the pinching part K and the soldering in the recess 119B. A connecting solder H in a molten state is likely to spread over the plane. However in the present invention, as shown in FIG. 3, a position of the solder H is determined by the recess 119B between the projection 121 and the protruding part 119A, and thus the solder H is prevented from straying to other parts.

As shown in FIG. 2, the cable connection part 120 is formed of a curved swaging part 120A which is configured in such a manner that a diameter thereof can be reduced. By placing a metal core 104a of the output cable 104 on the swaging part 120A and swaging the swaging part 120A so as to surround the metal core 104a, the output cable 104 can be connected to the terminal strip 106 in a conduction state.

It should be noted that a rear face of the terminal box B is attached to the solar cell module with an adhesive or the like. In addition, an inner space of the terminal box B may be injected with resin for the purpose of waterproof, insulation and the like.

According to the terminal box of the present embodiment, the terminal strip 106 is provided with the recess 119B, thus the solder H can be prevented from straying, and the diode 118 can be securely fixed to the terminal strip 106 even though the amount of the solder H is small. In addition, the lead wire 118a of the diode 118 supported in a mounted state by the protruding parts 119A of the terminal strip 106 can be securely fixed to the terminal strip 106 by pinching the pinching part K and soldering the lead wire 118a in the recess 119B. Further, the specific configuration described above does not require special parts and can be achieved by a simple processing on the single terminal strip 106, and thus production costs can be reduced.

Modifications of Embodiment 1

Hereinbelow, modifications of the embodiment will be described.
(1) The shape and structure of the terminal box B are not limited to those illustrated in the embodiment described above. For example, the planar shape may not be a rectangular shape and may be a polygonal shape other than a rectangle, or circular shape, elliptical shape or the like. In addition, the terminal box B may be in a shape of a box without a lid.
(2) The shape and structure of the terminal strip 106 are not limited to those illustrated in the embodiment described above. For example, the protruding part 119A or the cut and raised part 119C may be modified. From pairs of the projections 121 of the cut and raised part 119C positioned at both lateral edges of the terminal strip 106, only a pair positioned on an outer side of the main body 101 may be swaged so that the lead wires 118a on both lateral sides of the diode 118 are pinched. Alternatively, all of the projection 121 on both lateral edges of one of the terminal strips 106 may be swaged in such a manner that one of the lead wires 118a is pinched. Further, from pairs on the lateral edges of the terminal strip 106, only a pair positioned on an inner side of the main body 101 may be swaged in such a manner that one of the lead wires 118a of the diode 118 is pinched. Moreover, one or both of the recesses 119B on both lateral sides of the protruding part 119A may be soldered.
(3) In the embodiment described above, the number of the terminal strip 106 is two and the number of the diode 118 is one, but the present invention is not limited to these numbers. For example, the number of the terminal strip 106 may be three or more, and the number of the diode 118 may be two or more. These numbers may be appropriately selected while taking the volume of the solar cell module or the like into account.

Embodiment 2

Figure 5:
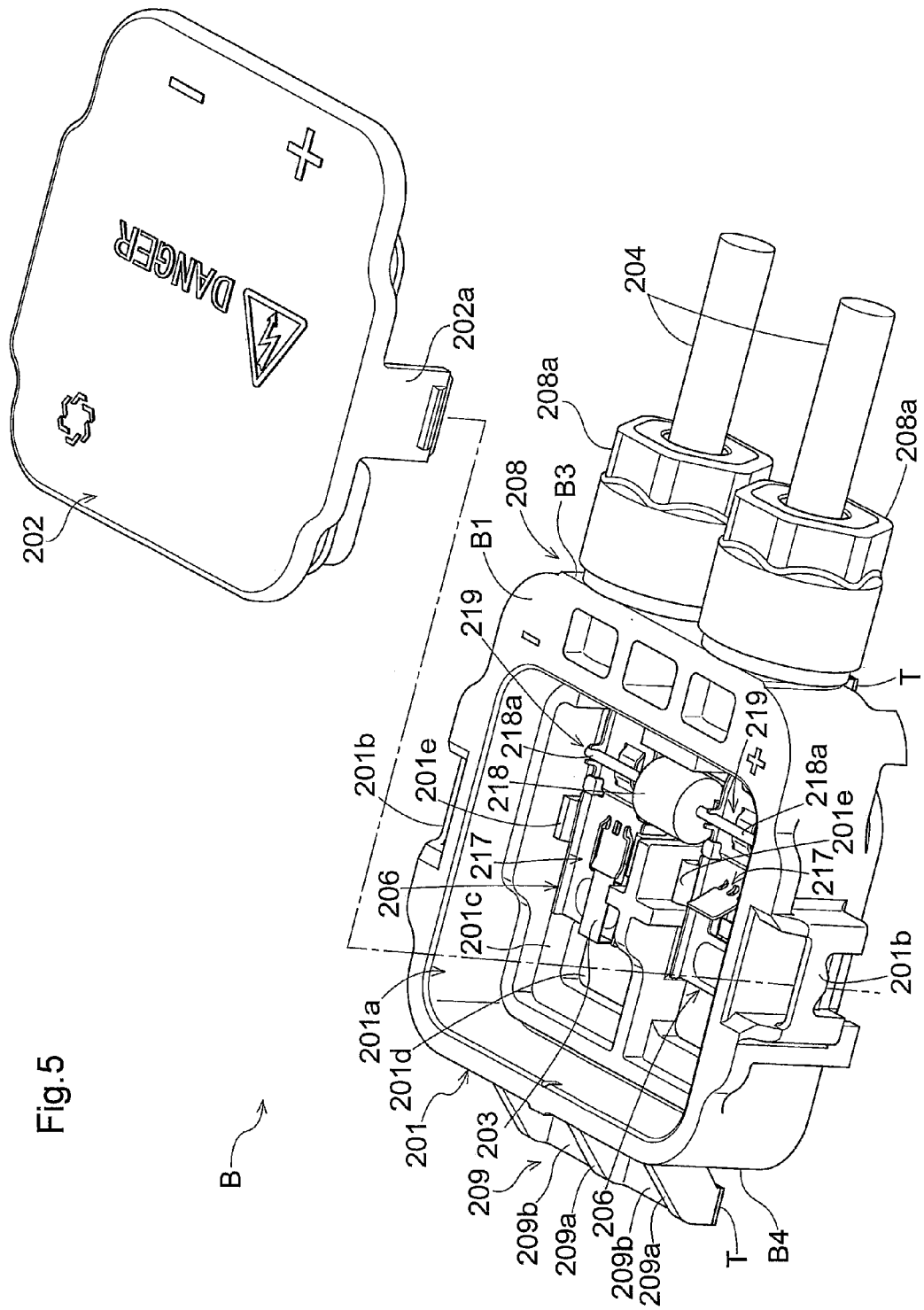
FIG. 5 is an exploded perspective view showing a terminal box in Embodiment 2.

FIG. 5 shows a terminal box B for a solar cell module according to the present invention. The terminal box B includes: a main body 201 made of resin; and a lid 202 made of resin for closing an opening 201a of the main body 201.

The terminal box B is in a shape of a flat cuboid. The main body 201 has the opening 201a, and the opening 201a is closable by covering a front face part B1 with the lid 202. A rear face B2 of the main body 201 is formed as an adhesive surface 207 to which an adhesive material for attaching to a solar cell module M is applicable. From among four lateral faces of the terminal box B (the main body 201), one lateral face (first lateral face) B3 is provided with a pair of connection parts 208 for connecting a pair of respective external cables 204. In addition, the other lateral face (second lateral face) B4 which is on an opposite side to the lateral face B3 is provided with a reinforcing rib 209 which juts out and comes into contact with a surface of the solar cell module M when installed.

The main body 201 has a pair of locking parts 201b integrally formed on respective lateral sides of the main body 201. The lid 202 has a pair of claws 202a integrally formed on respective lateral sides of the lid 202. By pushing the claws 202a of the lid 202 into the respective locking parts 201b of the main body 201 and allowing the claws 202a and the respective locking parts 201b to lock together, the opening 201a of the main body 201 is closed with the lid 202.

Inside the main body 201, a pair of terminal strips 206 are attached. A pair of the terminal strips 206 (corresponding to terminal part) are configured to electrically connect a pair of respective band plate-shaped output terminals 203 of the solar cell module to a pair of respective output cables 204 connected to a storage battery or the like.

In a bottom plate 201c of the main body 201, a pair of introduction holes 201d are formed so as to penetrate the bottom plate 201c. A pair of the output terminals 203 are separately introduced inside the main body 201 through the respective introduction holes 201d.

Figure 6:
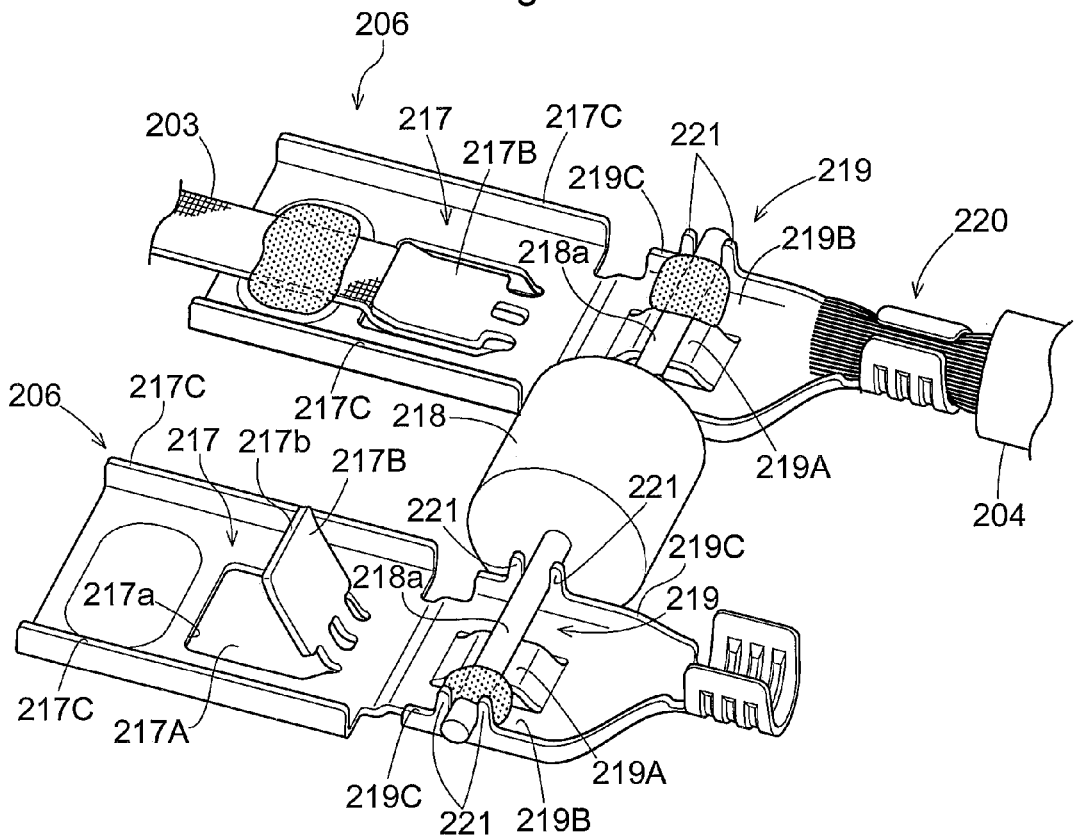
FIG. 6 is a perspective view of a relevant part showing a connection state of terminal strips in Embodiment 2.

Each of the terminal strips 206 is formed of a conductive metal plate. As shown in FIG. 6, the terminal strip 206 includes: a terminal connection part 217 to which the output terminal 203 is electrically connected; a diode connection part 219 to which a backflow prevention diode (hereinafter, simply referred to as "diode") 218 is electrically connected; and a cable connection part 220 to which a core of a cable 204 to be connected to the connection part 208 is electrically connected, all integrally formed together. The terminal strip 206 is fixed to the main body 201 by locking claws 201e vertically arranged on the bottom plate 201c (see FIG. 5).

As shown in FIG. 6, the terminal connection part 217 includes: an approximately rectangular-shaped insertion hole 217A into which a distal end part of the output terminal 203 is inserted; and a swingable locking piece 217B which is formed of a piece cut and raised at one peripheral side part of the insertion hole 217A. In addition, each of both lateral edge parts of the terminal connection part 217 is raised upward as a rib 217C, for reinforcing the terminal connection part 217. The rib 217C is to be locked with the locking claw 201e of the main body 201.

One example of a method for attaching the output terminal 203 to the terminal connection part 217 includes: inserting the distal end part of the output terminal 203 into the insertion hole 217A; pushing the swingable locking piece 217B back to the insertion hole 217A; and compressing and fixing the output terminal 203 between an inner edge part 217a of the insertion hole 217A and an edge part 217b on a swingable distal end side of the swingable locking piece 217B. Further, a part of the output terminal 203 overlapping an upper face of the terminal connection part 217 may be soldered.

Each of both lateral edge parts of the diode connection part 219 is formed as a cut and raised part 219C in a shape of a rib which is cut and raised upward. On the other hand, in a central part in a width direction of the diode connection part 219, a protruding part 219A is formed by protruding a part of a face of the terminal strip 206. Consequently, a recess 219B is formed between the cut and raised part 219C and the protruding part 219A.

In addition, a pair of projections 221 are formed integrally with the cut and raised part 219C. A distance between the projections 221 is set in such a manner that a lead wire 218a of the diode 218 can be fitted therebetween. By fitting the lead wire 218a between a pair of the projections 221 and plastically deforming a pair of the projections 221 in a direction that they come close to each other (swaging a pair of the projections 221), the lead wire 218a is supported in a pinched state.

The lead wire 218a is supported in a mounted state on the protruding part 219A, and the diode 218 is attached to the terminal strip 206 through a combination of the pinching and fixing by the projection 221 and the soldering in the recess 219B. It should be noted that an inner space of the terminal box B may be injected with resin for the purpose of waterproof, insulation and the like.

Figure 7:
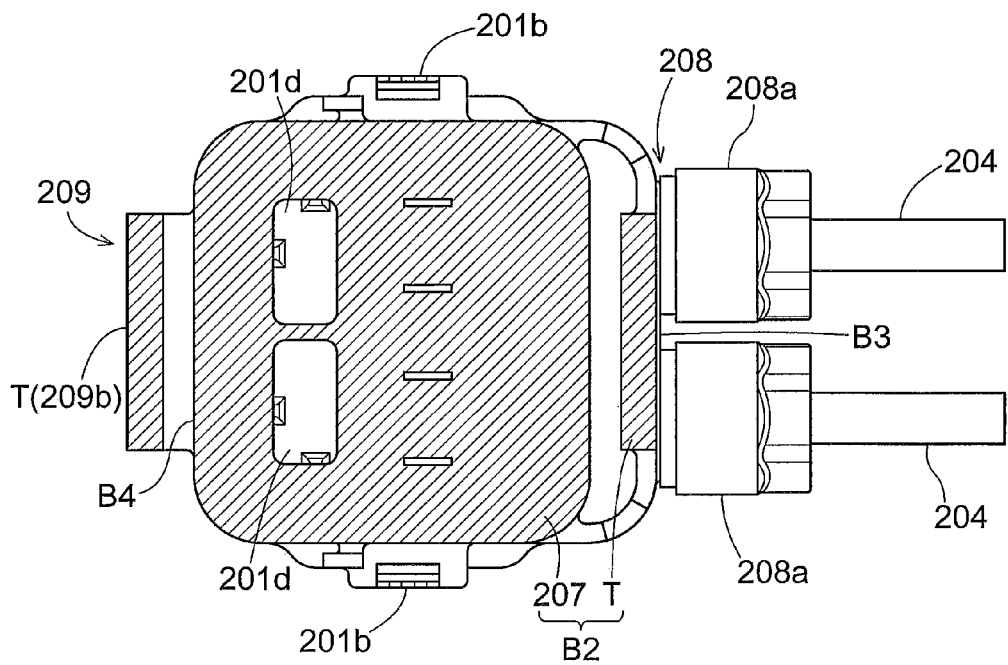
FIG. 7 is an explanatory diagram showing a rear face of the terminal box in Embodiment 2.

As shown in FIGS. 5 and 7, the connection part 208 is provided with screw members 208a, each of which is for fixing the cable 204 to the lateral face B3. By connecting the core of the cable 204 to the output terminal 203 and tightening the screw member 208a, the cable 204 can be fixed to the lateral face B3.

Figure 8:
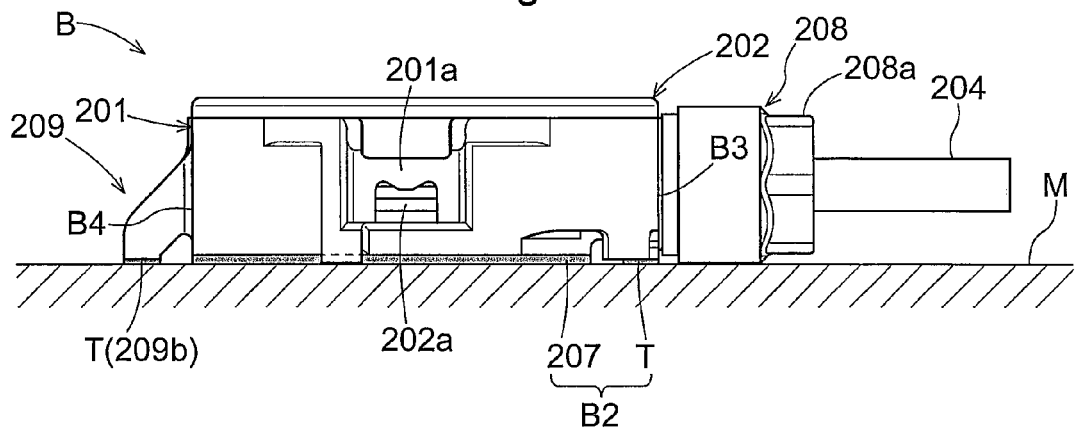
FIG. 8 is a side view of the terminal box in Embodiment 2.
Figure 9A:
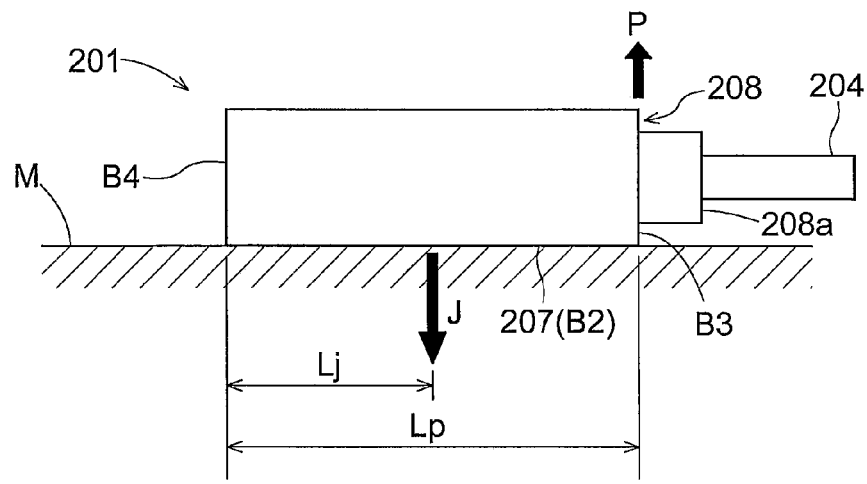
FIG. 9A is an explanatory diagram showing an action on the terminal box in Embodiment 2.
Figure 9B:
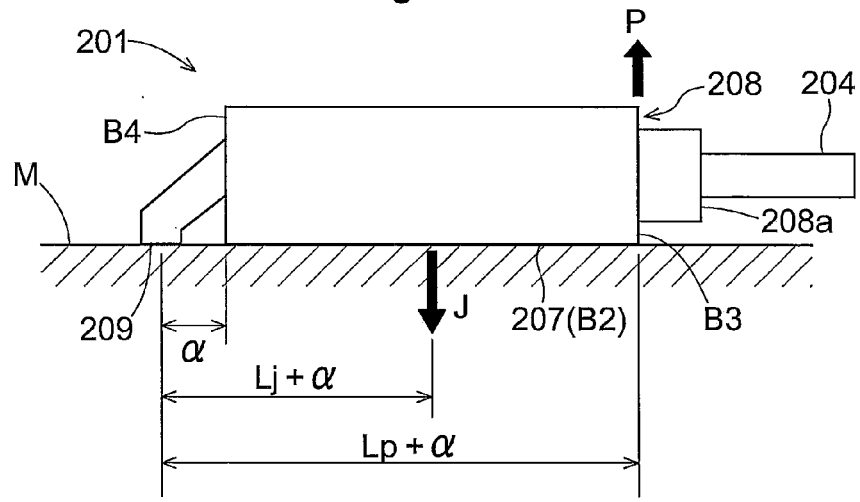
FIG. 9B is an explanatory diagram showing an action on the terminal box in Embodiment 2.

As shown in FIGS. 7 and 8, the adhesive surface 207 occupies a major part of the rear face B2 of the terminal box B. By applying the adhesive material to the adhesive surface 207 and attaching the adhesive surface 207 to a predetermined position on the solar cell module M, the terminal box B can be installed. In addition, in the rear face B2 of the terminal box B, to an edge part on a connection part 208-side relative to the adhesive surface 207, a double-stick tape T is attached. Likewise, to a ground part of the reinforcing rib 209 to the solar cell module M, the double-stick tape T is attached. With these two double-stick tapes T, the terminal box B is temporarily fixed to the solar cell module M, to thereby prevent a positional shift of the terminal box B until the adhesive material applied to the adhesive surface 207 exerts a satisfactory strength.

As shown in FIG. 5, the reinforcing rib 209 includes: three vertical ribs 209a projecting from the lateral face B4 of the terminal box B; and a ground plate 209b (corresponding to contacting part) bridged among distal end parts of the respective vertical ribs 209a. To the ground plate 209b, the double-stick tape T is attached as described above. In addition, the ground plate 209b is provided at a distance from the adhesive surface 207 of the main body 201.

According to the terminal box of the present embodiment, the reinforcing rib 209 can serve as a strength member together with the main body 201, and at the same time, the terminal box attached to the solar cell module M becomes less likely to be removed when the external force in the removing direction acts on the connection part 208, as compared with the conventional terminal box. In addition, with the use of the double-stick tapes T, the main body 201 is temporarily fixed to the solar cell module M and thus the terminal box can be prevented from being shifted until the adhesive material exerts a strength, and therefore, the main body 201 is further securely attached. When the adhesive material is applied to the adhesive surface 207, since the double-stick tapes T are away from the adhesive surface 207, the application work can be performed efficiently without paying attention to the presence of the double-stick tapes T.

Modification of Embodiment 2

The shape, structure and number of the reinforcing rib 209 are not limited to those illustrated in the embodiment described above, and may be appropriately modified. To put it another way, any reinforcing rib 209 can be used, as long as the reinforcing rib 209 juts out integrally from the lateral face B4, which is on the opposite side to the connection part 208 of the main body 201, and the presence of the reinforcing rib 209 enlarges a rotation radius when an external force P in the removing direction acts on the connection part 208. It is a matter of course that the reinforcing rib is provided further on a lateral face other than the lateral face B4 of the main body 201. In this case, a reinforcing effect of the main body 201 is further enhanced. In addition, to the reinforcing rib 209, the double-stick tape T is not necessarily attached.

In Embodiment 2 also, the modifications (1) and (3) of Embodiment 1 may be adopted.

Embodiment 3

Figure 10:
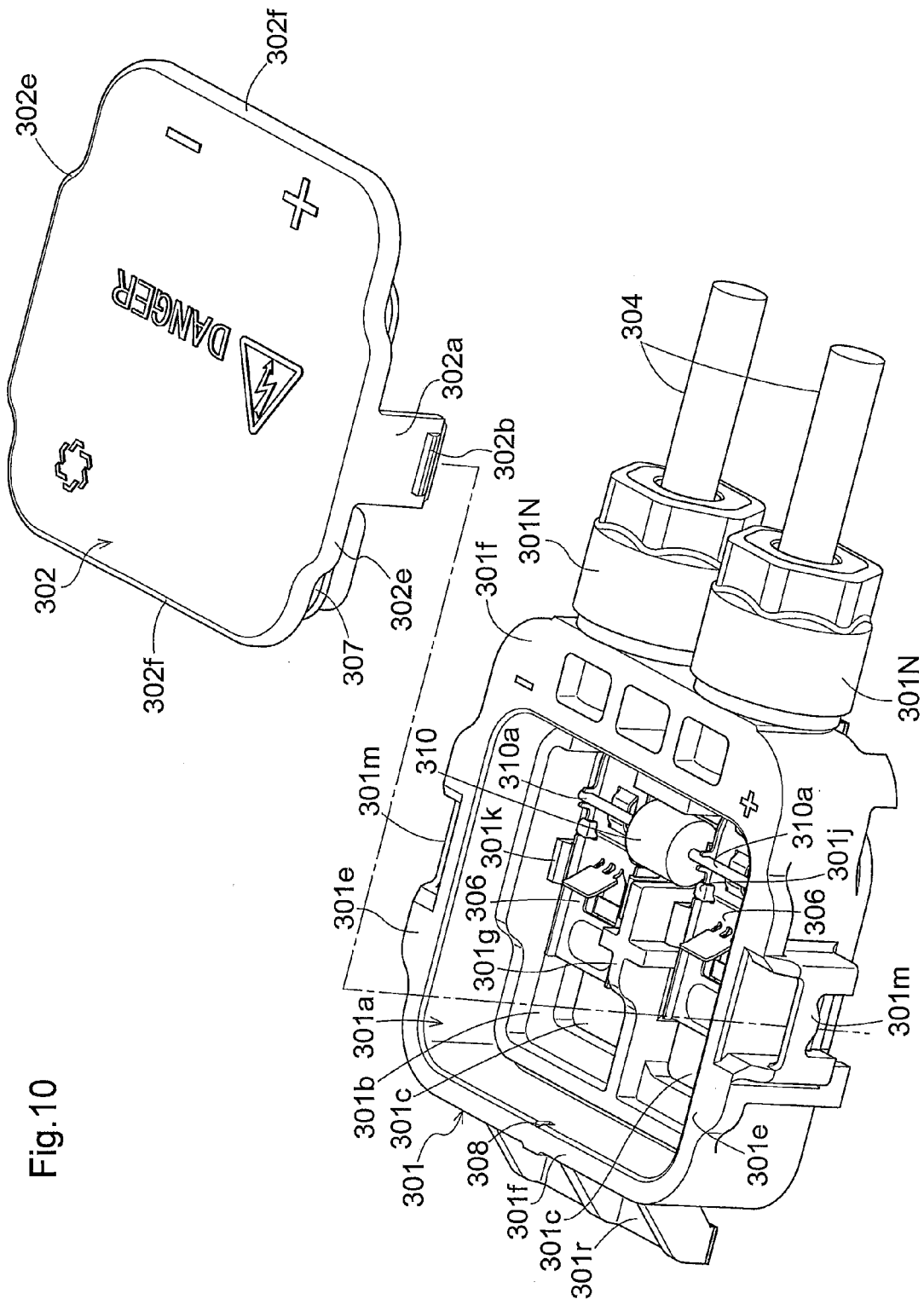
FIG. 10 is a perspective view of a terminal box in Embodiment 3 from which a lid is removed.

FIG. 10 shows a terminal box for a solar cell module according to the present invention. The terminal box includes: a main body 301 made of resin; and a lid 302 made of resin for closing an opening 301a of the main body 301. The lid 302 can close the opening 301a through connection holding to the main body 301 achieved by a retention mechanism.

As shown in FIGS. 10-14, a pair of terminal strips 306 are provided inside the main body 301 of the terminal box. A pair of the terminal strips 306 and respective lead wires 310a of a bypass diode 310 are connected by soldering with respective solders S. A pair of band plate-shaped output cables 303 (one example of output terminal) of the solar cell module are led through respective introduction ports 301c of a bottom wall 301b of the main body 301 into the main body 301, and the output cables 303 and the respective terminal strips 306 are connected by soldering with the respective solders S. In addition, a pair of power cables 304 are inserted through respective insertion holes 301d formed in the main body 301 into the main body 301, cores 304a of the power cables 304 are led toward the opening 301a (led into the main body 301), and the cores 304a are connected to the respective terminal strips 306 through swaging.

It should be noted that, for connecting the output cable 303 or the core 304a of the power cable 304 to the terminal strip 306, any connection mode can be adapted, including soldering and swaging. Further, a connection may be achieved by swaging and further soldering. In this case, the connection becomes further secured.

The terminal box is adhered and attached to a rear face or the like of the solar cell module, when in use. For this purpose, electric power of the solar cell module is input through the output cable 303 of the terminal box, and output through the power cable 304. The number of the terminal box corresponds to the number of the solar cell modules. It should be noted that, the power cable 304 is connected to a storage battery, an inverter or the like, and the electric power is used at ordinary home, factory or the like.

<Main Body—Lid>

Figure 11:
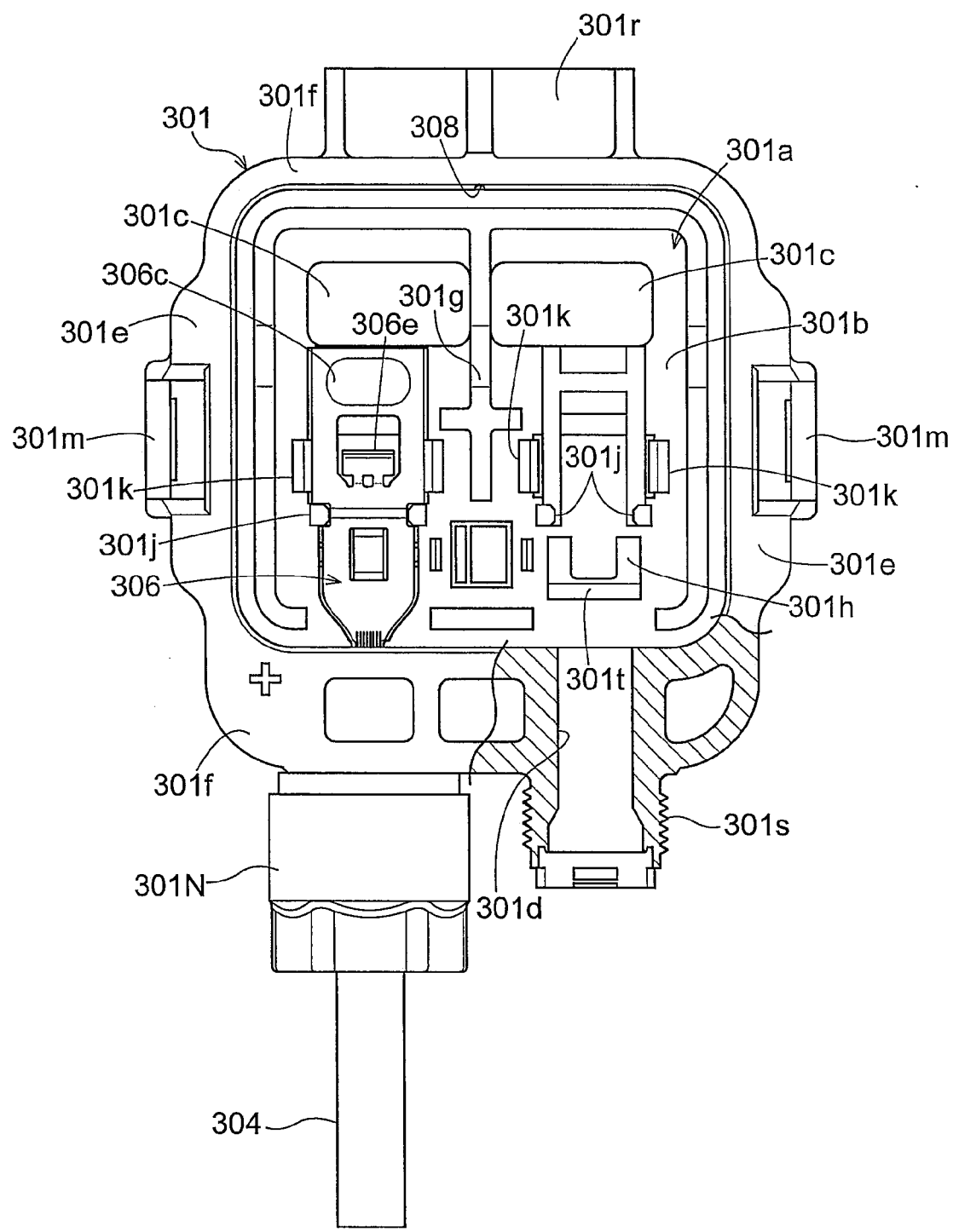
FIG. 11 is a partially cutaway plan view of a main body in Embodiment 3.

Referring to FIG. 11, in the main body 301, a pair of longitudinal walls 301e and a pair of transversal walls 301f are integrally formed so as to surround an outer periphery of the bottom wall 301b in an approximately square shape. In addition, outside the transversal wall 301f on an upper side in the drawing, a reinforcing rib 301r is integrally formed so as to protrude upward. The terminal box of the present invention may be used in a posture different from the posture shown in the drawing, but herein a positional relationship will be described based on a posture of the main body 301 shown in the drawing. It should be noted that from among four walls, those extending longitudinally in the drawing are referred to as "longitudinal wall 301e", while those extending transversally are referred to as "transversal wall 301f", for convenience.

From a pair of the transversal walls 301f, the wall on a lower side in the drawing is formed thicker, and a pair of the insertion holes 301d described above are formed in parallel in the transversal wall 301f on the lower side, so that the insertion holes 301d penetrate the transversal wall 301f in a longitudinal direction. In an outer face of the lower transversal wall 301f (lower face in the drawing), threaded parts 301s are formed and provided with respective nuts 301N screwable with the threaded part 301s. When the power cable 304 is inserted into the insertion hole 301d, a bush 304b is fitted onto the power cable (see FIG. 14), and the nut 301N is screwed with the threaded part 301s to thereby tighten the threaded part 301s. With this configuration, the power cable 304 is supported by the main body 301 while an air tight state is achieved with the bush 304b.

In the bottom wall 301b of the main body 301, a pair of the introduction ports 301c are formed as described above. In addition, in the bottom wall 301b, a partition wall 301g is formed at a position where a pair of the introduction ports 301c are separated. Further, in a region partitioned by the partition wall 301g of the bottom wall 301b, a terminal block 301h in a shape of a rib is formed. In the terminal block 301h, there are formed regulation pieces 301j for determining an engagement position of the terminal strip 306 and engaging retainers 301k each having a hook part for engaging and holding the terminal strip 306. It should be noted that, each of the regulation piece 301j and the engaging retainer 301k are provided in a pair for a single terminal strip 306, so as to engage and hold the terminal strip 306 in a sandwiching manner in a width direction.

Figure 13:
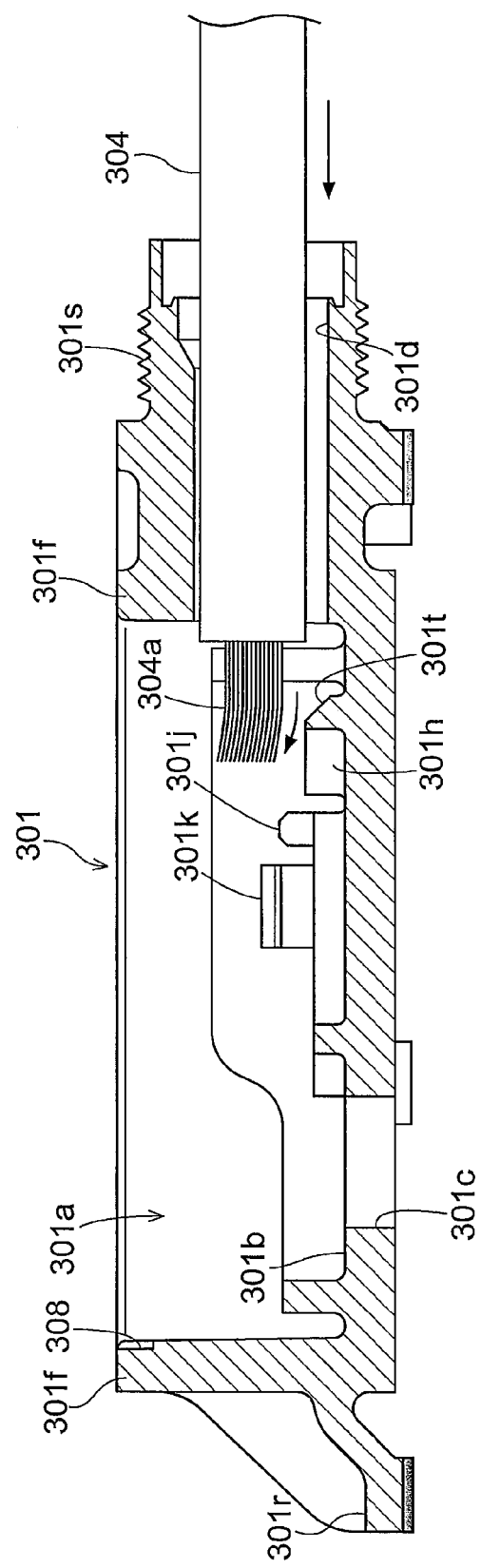
FIG. 13 is a cross-sectional view of the main body showing a configuration during an insertion of the power cable in Embodiment 3.

As shown in FIGS. 11 and 13, from among the parts of the terminal block 301h, especially in a part facing the insertion hole 301d into which the power cable 304 is inserted, an inclined face 301t is formed which is brought into contact with the core 304a of the power cable 304 (one example of the distal end part of the power cable 304) and guides the core 304a in a direction away from the bottom wall 301b (direction toward the opening 301a).

Figure 14:
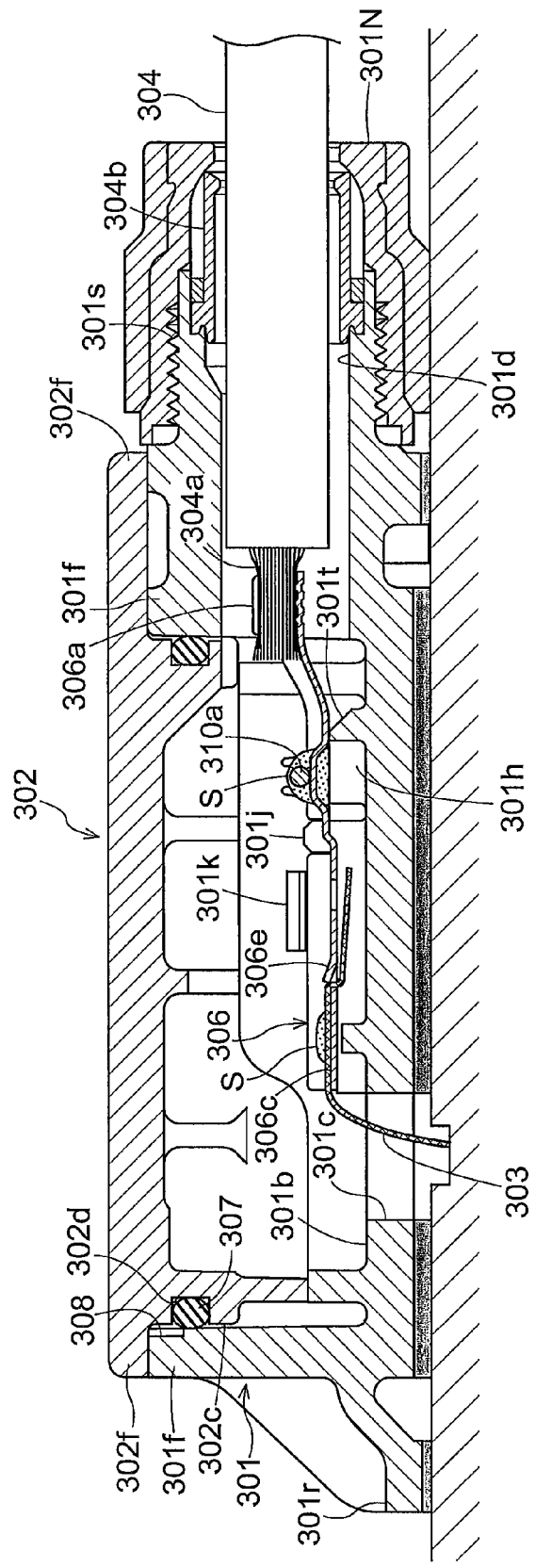
FIG. 14 is a cross-sectional view of the terminal box in Embodiment 3 in use.

Referring to FIGS. 13 and 14, the insertion hole 301d is formed at a position displaced toward the opening 301a relative to a wall face of the bottom wall 301b. As a result, a step is formed between the insertion hole 301d and the bottom wall 301b. In addition, the inclined face 301t is formed in a region from a vicinity to the bottom wall 301b to a support face of the terminal strip 306 (a face brought into contact with the terminal strip 306 from among faces of the terminal block 301h). With this configuration, even if the core 304a of the power cable 304 inserted into the insertion hole is oriented toward the bottom wall 301b, the core 304a can securely come into contact with the inclined face 301t of the terminal block 301h.

As shown in FIG. 10, the lid 302 has a pair of longitudinal sides 302e oriented longitudinally (in terms of the direction in FIG. 11) and a pair of transversal sides 302f oriented transversally (in terms of the direction in FIG. 11). In addition, the lid 302 has a rectangular shape which is approximately the same as the shape of the main body 301. In an outer face of each of the longitudinal walls 301e of the main body 301, a locking part 301m is formed. On the other hand, in each of the longitudinal sides 302e of the lid 302, an arm part 302a is formed, and in the end part of the arm part 302a, a claw part 302b is formed. The locking part 301m, the arm part 302a and the claw part 302b constitute the retention mechanism described above.

With this configuration, when the lid 302 is pressed in a direction that closes the opening 301a of the main body 301, the claw part 302b reaches an engagement state with the locking part 301m, and the lid 302 is retained at a closed position. Even when the claw part 302b is engaged with the locking part 301m, the lid 302 can be removed by manual operation of releasing the engagement of the claw part 302b.

As shown in FIGS. 14 and 15, on an inner face side of the lid 302, there is integrally formed a projecting wall part 302c which is configured to be inserted in the opening 301a of the main body 301 and proximate to an inner wall face of the opening 301a. In an outer periphery of the projecting wall part 302c, an annular groove 302d is formed. The annular groove 302d is provided with a ring-shaped sealing member 307 made of flexible resin.

Figure 15A:
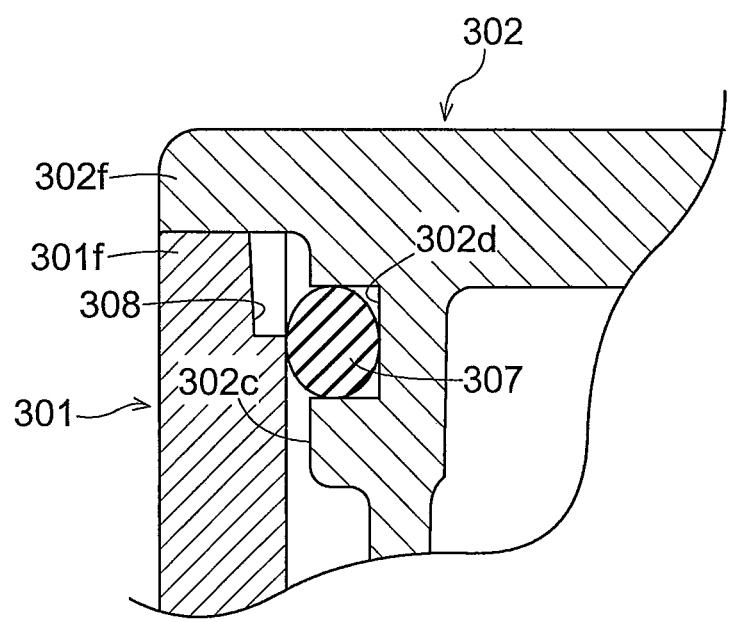
FIG. 15A is a cross-sectional view showing a positional relationship between a sealing member and an air vent in Embodiment 3.

Especially, in an inner face of the upper transversal wall 301f of the main body 301, there is formed a groove-shaped air vent 308 extending from inside the main body 301 to an opening edge of the opening 301a. Due to this configuration, when the opening 301a of the main body 301 is closed with the lid 302 (the lid 302 is retained at the closed position), as shown in FIG. 15A, the sealing member 307 supported on the lid 302 is brought into close contact with both the projecting wall part 302c of the lid 302 and the inner wall face of the opening 301a of the main body 301, in such a manner that the sealing member 307 comes into contact with a part of the inner wall face of the opening 301a on a bottom wall side relative to the air vent 308. With this configuration, rain water and dust are securely prevented from entering the terminal box.

The terminal box is attached to a rear face or the like of the solar cell module in such a manner that the reinforcing rib 301r and a rear face of the main body 301 are adhered to the rear face or the like of the solar cell module. In this case, when the lid 302 is retained at the closed position, an internal space of the main body 301 becomes sealed. When air inside the main body 301 expands, an internal pressure acting on the lid 302 increases. As described above, since the lid 302 is engaged with and connected to the main body 301 at portions outside the longitudinal wall 301e, the transversal side 302f on the upper side (in terms of the direction in FIG. 11) and the transversal side 302f on the lower side (in terms of the direction in FIG. 11) of the lid 302 are elastically deformed in a direction that raises the transversal side 302f from the main body 301.

Figure 15B:
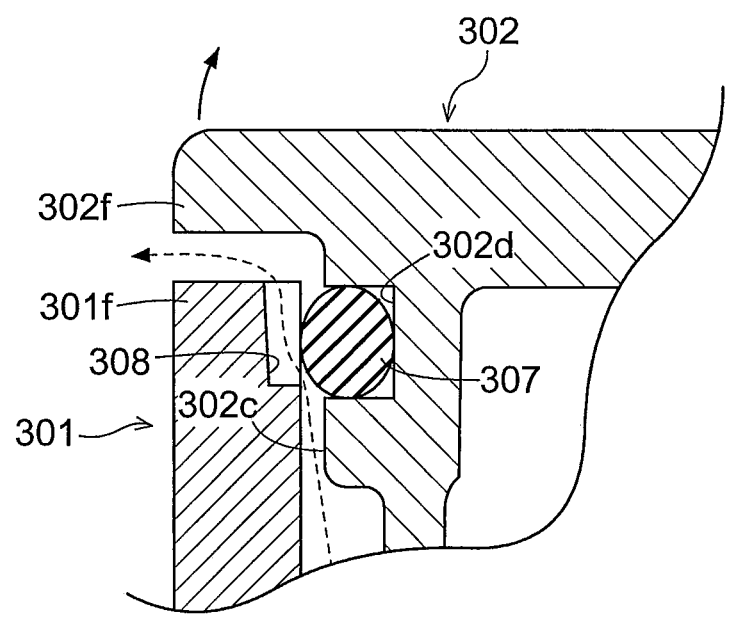
FIG. 15B is a cross-sectional view showing a positional relationship between a sealing member and an air vent in Embodiment 3.

As described above, when the transversal side 302f on the upper side of the lid 302 is elastically deformed due to the increase in the internal pressure of the main body 301, as shown in FIG. 15B, the sealing member 307 is displaced. When the sealing member 307 is displaced and reaches a position where the sealing member 307 overlaps the air vent 308, the air inside is discharged through the air vent 308 outside the main body 301. With this configuration, the internal pressure of the main body 301 is reduced and the deformation of the lid 302 is suppressed.

<Terminal Strip>

Figure 12:
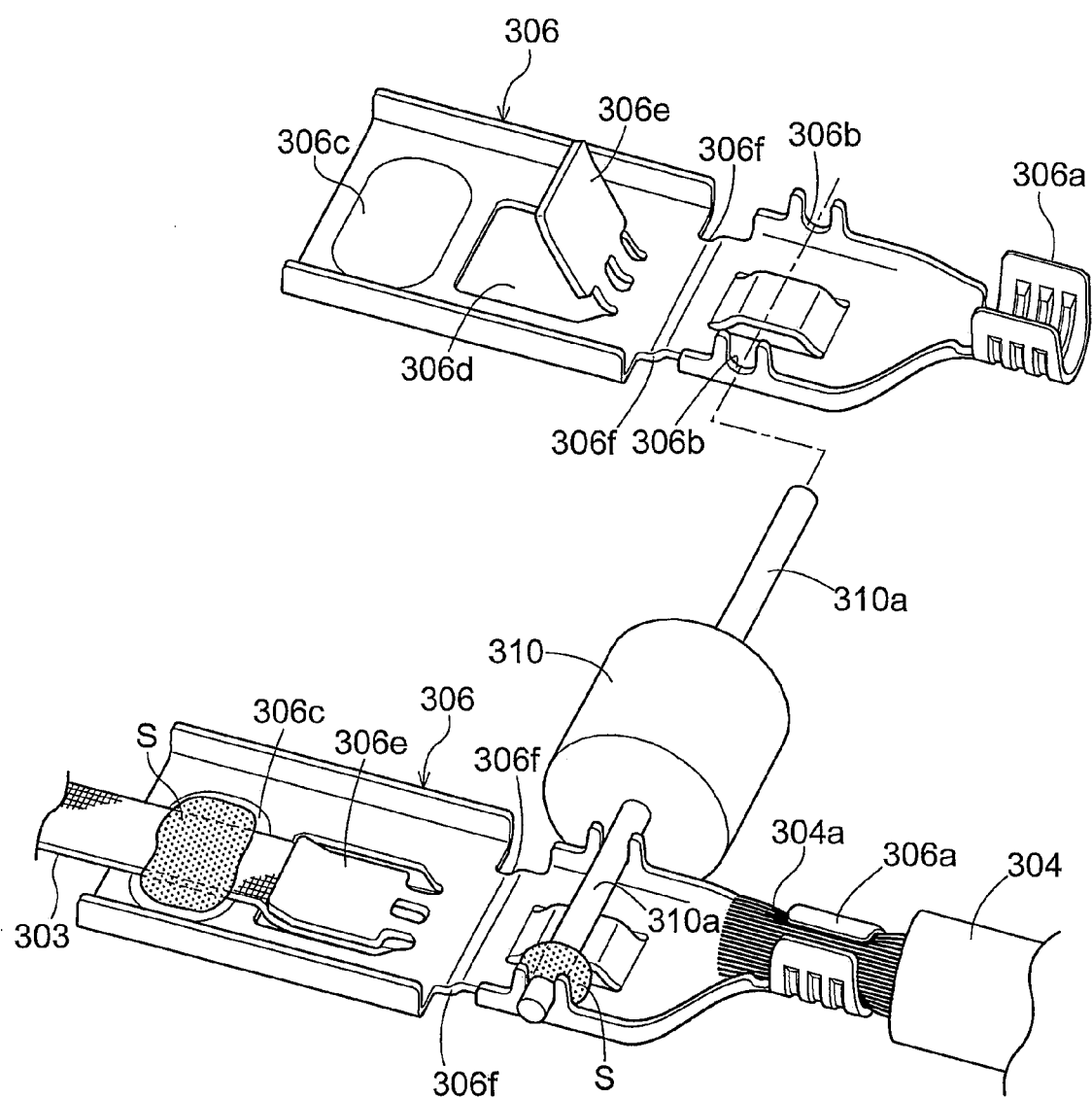
FIG. 12 is a perspective view showing a connecting relationship among a terminal strip, a power cable and the like in Embodiment 3.

As shown in FIG. 12, the terminal strip 306 is formed of a strip-shaped plate material made of good conductor, such as copper alloy, by press work, so as to have a configuration in which both end parts in the width direction are raised each in a shape of a rib along an entire longitudinal direction. In one end part of the terminal strip 306, a crimp connection part 306a is formed for connecting the core 304a of the power cable 304 by swaging. In addition, at a position in the vicinity of the crimp connection part 306a of the terminal strip 306, a lead wire connection part 306b is formed for connecting the lead wire 310a of the bypass diode 310. In the other end part of the terminal strip 306, a conductive surface 306c is formed for connecting the output cable 303 by the solder S. In addition, at a position next to the conductive surface 306c of the terminal strip 306, there are formed an engaging hole 306d into which the output cable 303 is inserted, and a tongue-shaped engaging piece 306e. Moreover, at an intermediate part of the terminal strip 306, there is formed a pair of regulation recesses 306f in each of which the regulation piece 301j described above is fitted.

The crimp connection part 306a has a U-shaped cross section so that the core 304a of the power cable 304 is insertable. The lead wire connection part 306b has a pair of recesses in the respective rib-shaped parts described above for engaging the lead wire 310a. The conductive surface 306c is in a shape of a plane. The engaging piece 306e is cut out from a part of the plate material and raised obliquely. The formation of the engaging piece 306e leaves a hole region in the plate material as the engaging hole 306d. The regulation recess 306f has a configuration obtained simply by cutting out an edge end of the plate material.

When the output cable 303 and the power cable 304 are to be connected to the terminal box, the lid 302 is removed from the main body 301 and a pair of the terminal strips 306 are detached from the main body 301, in advance.

In this state, the output cable 303 is inserted into the introduction port 301c of the main body 301, and an end part thereof is inserted into the engaging hole 306d from an upper face side of the terminal strip 306. By bending the engaging piece 306e toward the engaging hole 306d, the output cable 303 is compressed and retained between an inner edge portion of the engaging hole 306d and the engaging piece 306e. Further, a part near a distal end of the output cable 303 is connected and fixed to the conductive surface 306c of an upper face of the terminal strip 306 with the solder S, to thereby make them electrically conductive.

With the core 304a being exposed by removing a coating on the end part of the power cable 304, the power cable 304 is inserted through the insertion hole 301d of the main body 301. During this insertion, as shown in FIG. 13, the core 304a of the power cable 304 comes into contact with the inclined face 301t of the terminal block 301h, and the core 304a is guided toward the opening 301a. With this configuration, a bundle in the core 304a can be inserted without being disturbed (without being unraveled). The inserted power cable 304 is then pulled out, the core 304a of the power cable 304 is pressed against the crimp connection part 306a of the terminal strip 306, to thereby make them electrically conductive. As descried above, the work order for connecting the output cable 303 and connecting the power cable 304 to the terminal strip 306 is not determined, and any connection can be performed first.

Next, the terminal strip 306 to which the output cable 303 and the power cable 304 are connected as described above is held in engagement with the engaging retainer 301k of the main body 301. Upon this engagement holding, the regulation pieces 301j of the main body 301 are fitted into the respective regulation recesses 306f of the terminal strip 306 to thereby determine the position of the terminal strip 306, and the terminal strip 306 is pushed into towards the bottom wall 301b. With this configuration, the terminal strip 306 is allowed to be pushed into while a pair of the engaging retainers 301k are elastically deformed, and hook parts of the engaging retainer 301k reach a state in which the terminal strip 306 is held, to complete a holding action of the terminal strip 306.

After the holding action of a pair of the terminal strips 306 is completed, a pair of the lead wires 310a of the bypass diode 310 are placed in the lead wire connection parts 306b of the respective terminal strips 306 and soldered with the solder S, to thereby electrically connect a pair of the lead wires 310a to a pair of the terminal strips 306. It should be noted that the soldering of a pair of the lead wires 310a to the lead wire connection part 306b of the terminal strip 306 as described above may be performed before the terminal strip 306 is engaged with the main body 301. In addition, the end part of the output cable 303 may be soldered to the conductive surface 306c of the terminal strip 306 after the terminal strip 306 is held in engagement with the main body 301.

Subsequently, the lid 302 is set so as to close the opening 301a of the main body 301. Consequently, the sealing member 307 supported on the lid 302 is brought into close contact with both the projecting wall part 302c of the lid 302 and the inner wall face of the opening 301a of the main body 301, and the inside of the terminal box reaches a sealed state. Then, the terminal box in this state is adhered to the rear face or the like of the solar cell module, and the work process is completed.

Modifications of Embodiment 3

The present invention may be configured in the following manners other than the embodiments described above.
(1) The present invention may be applied to a terminal box having three or more terminal strips 306. In this case, the number of the power cables 304 inserted into the terminal box may be two or more. In this case, the inclined face 301t is formed in the terminal block 301h for supporting the terminal strip 306 corresponding to the power cable 304.
(2) For supporting the terminal strip 306 on the main body 301, the terminal strip 306 may be fixed by tightening a screw.

Further Modifications of Embodiment 3

(1) The air vent 308 may be formed in the transversal wall 301f on the lower side in FIG. 11. In this case, the air vent 308 may be formed also in the transversal wall 301f on the upper side. Especially in the present invention, a plurality of the air vents 308 may be formed in the transversal wall 301f.
(2) The retention mechanism may be configured in such a manner that a lid is pulled and retained at the closed position by a spring or the like. With this configuration, when the internal pressure is increased, the entire lid can be displaced. In this case, air can be discharged due to this displacement, and after the pressure is decreased, the lid can be retained at the closed position by the spring biasing force.
(3) In a case where the retention mechanism is constituted using the spring, each side of the lid may be provided with the retention mechanism. A biasing force of one of the springs of the retention mechanisms is set lower than the spring biasing forces of the other retention mechanisms, and the groove-shaped air vent is formed in an inner wall of the opening at a position where the retention mechanism with the lower spring biasing force is provided. Due to this configuration, a part of the lid (a portion where the spring biasing force is low) is easily displaced, and thus the discharge of air can be performed at a specific position when the internal pressure is increased.

It should be noted that, as described above, the reference characters are used for convenience of reference to the attached drawings. However, it should not be construed that the designation by the reference characters limits the present invention to the configurations of the attached drawings. Needless to say, the present invention can be carried out in various embodiments without departing from the spirit and scope of the present invention.

What is claimed is:

1. A terminal box comprising:
a main body;
at least one pair of terminal parts which are provided in the main body and connectable to a positive electrode and a negative electrode of a solar cell module;
at least one pair of connection parts which are provided on a first lateral face of the main body and configured to conductively connect an external cable to the terminal part; and
an adhesive surface which is provided on a rear face of the main body and adhesive to the solar cell module, wherein
a reinforcing rib is provided on a second lateral face on an opposite side of the main body to the connection part, the reinforcing rib jutting out and having a contacting part that comes into contact with a surface of the solar cell module when installed, and
the contacting part of the reinforcing rib is formed at a distance from the second lateral face.

2. The terminal box according to claim 1, wherein a double-stick tape adhesive to the surface of the solar cell module is attached to the contacting part of the reinforcing rib.

3. A terminal box comprising:
a main body; and
a terminal strip provided on a bottom wall of the main body, to which an output terminal of a solar cell module and a core of a power cable are connected,
wherein
the main body has a terminal block protruding from the bottom wall,
the terminal strip is provided on the terminal block,
the main body is provided with an insertion hole into which the power cable is inserted toward the terminal strip, and
the terminal block is provided with an inclined face which is brought into contact with an end part of the power cable and guides the end part in a direction away from the bottom wall when the power cable is inserted into the insertion hole.

4. The terminal box according to claim 3, wherein
the insertion hole is formed at a higher level than a level of the bottom wall as measured from the bottom wall,
the terminal block is provided with a support face configured to be brought into contact with the terminal strip, and
the inclined face spans a region between a vicinity of the bottom wall and the support face.

5. The terminal box according to claim 3 further comprising a lid, wherein
the main body has an opening at a position opposite to the bottom wall,
the lid is configured to close the opening, and
the terminal strip is removably held in engagement with the terminal block.

6. A terminal box comprising:
a main body having an opening;
a terminal strip which is provided in the main body and configured to electrically connect an output terminal of a solar cell module and a power cable; and
a lid configured to close the opening of the main body,
the terminal box further comprising:
a groove-shaped air vent which is formed in an inner wall face at the opening of the main body and extends from inside the main body to an opening edge of the opening;
a projecting wall part which is formed on an inner face side of the lid and configured to be fitted in the opening;
an annular sealing member supported on an outer periphery of the projecting wall part; and
a retention mechanism configured to retain the lid at a closed position, wherein
when the lid is retained at the closed position by the retention mechanism, the sealing member is brought into contact with a part of the inner wall face of the opening which part is located on a bottom wall side of the main body relative to the air vent, and when the lid is displaced in a direction away from the opening against a retaining force of the retention mechanism due to an increase of an internal pressure, the sealing member reaches a position where the sealing member overlaps the air vent through which air is allowed to be discharged.

7. The terminal box according to claim 6, wherein
the opening is in a rectangular shape,
the lid is in a rectangular shape having a pair of longitudinal sides and a pair of transversal sides,
the retention mechanisms are provided for connecting either a pair of the longitudinal sides or a pair of the transversal sides to the main body, and
the air vent is formed in the inner wall face of the opening facing the side of the lid which is not retained by the retention mechanism, from among the longitudinal sides and the transversal sides.

* * * * *